United States Patent [19]

MacLennan et al.

[11] 4,178,522
[45] Dec. 11, 1979

[54] INFRARED DETECTION APPARATUS

[75] Inventors: Donald J. MacLennan, Ballston Lake; Edwin E. Morris, Clinton, both of N.Y.

[73] Assignee: General Electric Company, Schenectady, N.Y.

[21] Appl. No.: 886,729

[22] Filed: Mar. 15, 1978

[51] Int. Cl.² .............................................. G01J 1/00
[52] U.S. Cl. .................................. 250/338; 250/332; 250/334; 328/167
[58] Field of Search ............... 250/334, 252, 332, 333, 250/339, 349, 330, 338; 358/113, 167; 328/165, 167, 151; 307/352, 353

[56] References Cited

U.S. PATENT DOCUMENTS

| 3,129,330 | 4/1964 | Seling | 250/334 |
| 3,751,586 | 10/1970 | Johansson | 358/113 |
| 3,806,729 | 4/1974 | Caywood | 250/339 |
| 3,979,589 | 9/1976 | Sternberg et al. | 250/252 |

*Primary Examiner*—Alfred E. Smith
*Assistant Examiner*—Carolyn E. Fields
*Attorney, Agent, or Firm*—Julius J. Zaskalicky; Joseph T. Cohen; Marvin Snyder

[57] ABSTRACT

In infrared detection and imaging systems circuits are provided for removing the high background thermal component of signal.

2 Claims, 4 Drawing Figures

INFRARED DETECTION APPARATUS

The present invention relates in general to infrared detection apparatus and in particular to circuits for removing the high background thermal component of signal occurring in infrared detection and imaging systems.

The detection of infrared signals poses some extremely difficult problems in electronic signal processing. One such problem is the existence of extremely low contrast in the detected infrared signal due to high background thermal level. As a consequence of the nature of the detected signal, a high degree of uniformity in the detectors of the arrays utilized is required. For example, a 0.1 percent variation in detector characteristics represents approximately a 0.3° K. temperature difference. As a 0.1 percent variation in characteristics in the detectors of an array represents a uniformity which is several orders of magnitude better than can be currently achieved, system performance can be seriously limited.

One commonly used technique for background signal rejection for circumventing the detector non-uniformity problem is to subtract the background component of a detected infrared signal on an individual pixel (picture element) to pixel basis. This may be done, for example, by AC coupling of individual pixel signals. This technique is cumbersome at best, and may not be entirely satisfactory for many applications because of its reliance on past pixel history for its estimate of background level.

The present invention is directed to the provision of circuits for electronically removing the high background thermal level in infrared detection and imaging systems on a pixel to pixel basis thereby avoiding the non-uniform detector effects present in infrared imaging systems utilizing arrays of detectors.

In carrying out the invention in one illustrative embodiment thereof there is provided a signal channel of sequential input signals. Each input signal corresponds to a line of scan of a scene and a background reference. Each input signal includes a sample corresponding to radiation received from the background reference and a plurality of succeeding samples corresponding to radiation received from the scene. A circuit means is provided for deriving a plurality of output signals. Each output signal corresponds to a respective one of the input signals in which the sample corresponding to the background reference is subtracted from each of the samples corresponding to the scene. The circuit means includes an input terminal, an output terminal and a reference terminal. A capacitor is connected between the input and the output terminal. A resistance and a normally open switch is connected between the output terminal and the reference terminal. The output of the signal channel is applied between the input terminal and reference terminal of the circuit means. Means are provided for closing the normally-open switch during the time of occurrence of the sample of each input signal corresponding to the background reference. The reciprocal of the on-time of the switch is made large in relation to the noise bandwidth of the sample corresponding to the background reference, and the time constant of the capacitance and the resistance is set to be long in relation to the on-time of the switch.

The novel features which are believed to be characteristic of the present invention are set forth with particularity in the appended claims. The invention itself, both as to its organization and method of operation, together with further objects and advantages thereof may best be understood by reference to the following description taken in connection with the accompanying drawings wherein:

Figure 1:
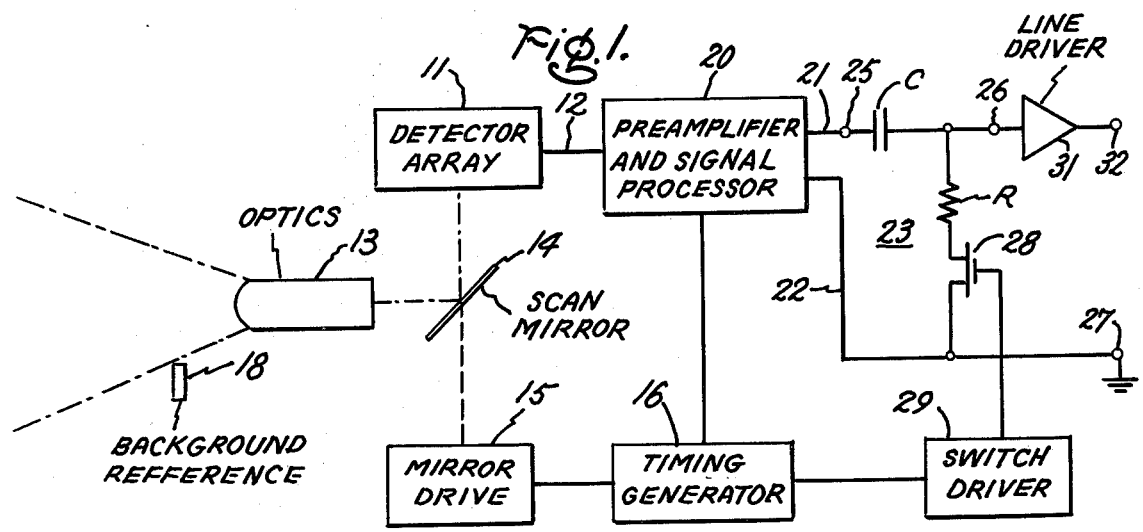
FIG. 1 shows a diagram partially in block form of infrared detection and imaging apparatus in accordance with the present invention.

Reference is now made to FIG. 1 which shows a diagram partially in block form of an infrared detection and imaging system embodying the circuit of the present invention for providing background level rejection. The system includes an array 11 of detectors and the signal processing associated therewith for providing a plurality of parallel outputs on lines 12, only one of which is shown, in response to infrared radiation imaged thereon from a scene (not shown) through infrared optics 13 and scan mirror 14. The scan mirror 14 is driven by a mirror drive motor 15 which, in turn, is synchronized by timing generator 16 to cause the infrared scene to be periodically scanned and to produce on each of the lines 12 of the detector array a respective time varying signal corresponding to the infrared radiation received by the detector array. The pre-amplifier and signal processor 20 includes a plurality of channels, each for pre-amplifying and processing the signal received on each of the input lines 12 and provide a plurality of outputs on lines 21, only one of which is shown, each output corresponding to a respective one of the inputs supplied to lines 12. Output line 22 of signal processor 20 is common to all channels. The pre-amplifier and signal processor 20 converts each of the analog signals applied to the inputs thereof to a sampled data signal, such as shown in FIG. 2A.

Figure 2A:
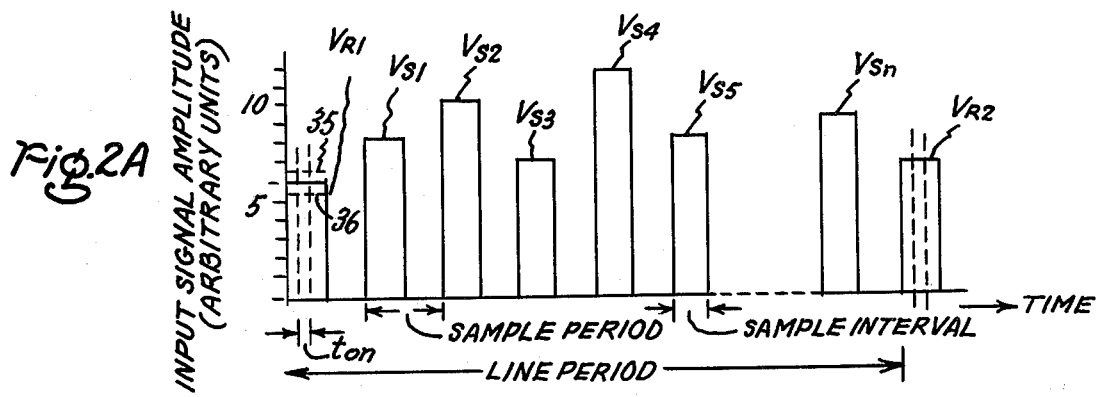
FIGS. 2A and 2B are diagrams of amplitude versus time of input and output signals useful in explaining the operation of the apparatus of FIG. 1.

FIG. 2A shows a line of video signal of a channel including data sample $V_{R1}$ representing a sampling of a background reference, such as object 18, in the field of view of the apparatus and a plurality of samples designated $V_{S1}$, $V_{S2}$, $V_{S3}$, $V_{S4}$, $V_{S5}$ through $V_{Sn}$. Also shown is a sample $V_{R2}$ representing the sample of the background reference during the next line of scan. The period between sample $V_{R1}$ and $V_{R2}$ is referred to as the line period. The period between corresponding edges of adjacent samples of a line of scan is referred to as the sample period. The duration of a sample is referred to as the sample interval. The timing generator 16 which controls the mirror drive 15 determines the line period. An output of the timing generator 16 is also applied to the pre-amplifier and signal processor 20 and controls the sampling period and the duration of the sample provided by the pre-amplifier and signal processor.

Figure 2B:
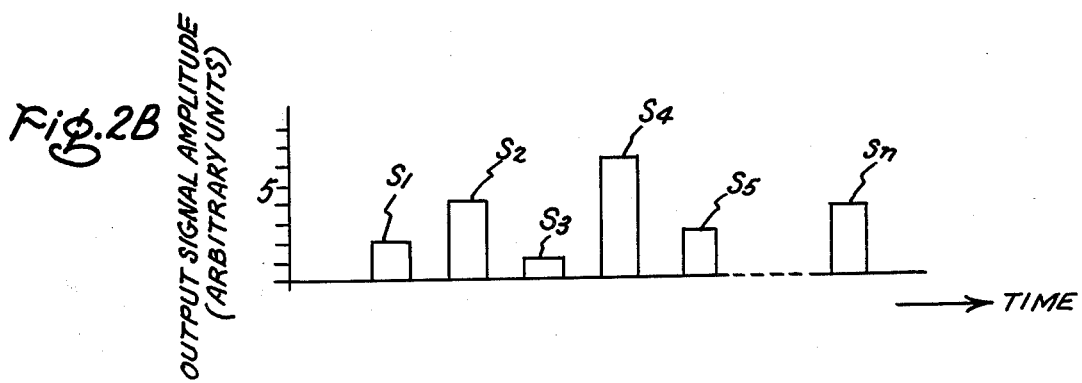

In accordance with the present invention, circuits 23 are provided in the infrared detection and imaging system for subtracting the sample from the background reference $V_R$ from each of the signal samples $V_{S1}$ through $V_{Sn}$ of a line of detected signals to derive a plurality of output samples $S_1$–$S_n$, each corresponding to a respective one of the output samples of a line of scan. a line of such samples is shown in FIG. 2B. The circuit 23 includes an input terminal 25, an output terminal 26, and a common or reference terminal 27. Line 21 is connected to input terminal 25 and line 22 is connected to common terminal. A capacitance C is connected between the input terminal 25 and the output terminal 26. A resistance R and the source-to-drain conduction path of the MOSFET transistor switch 28 are connected in series between the output terminal 26 and the common terminal 27. Conduction in the source-to-drain conduction path of the transistor switch 28 is controlled by voltage on the gate thereof. The gate of the transistor switch 28 is connected to the switch driver 29 which is synchronized with the timing generator 16. The switch driver 29 provides an output at the line scan rate and during the sample interval of the background reference sample $V_R$ to turn the switch ON. A line driver 31 having its input circuit connected to the output terminal 26 provides output at terminal 32 to drive the display circuits (not shown) of the system.

The operation of the apparatus of FIG. 1 will now be explained in conjunction with the signal waveform diagrams of FIGS. 2A and 2B. At the initiation of a line of scan, infrared radiation received from the background reference 18 is imaged on each detector of the detector array 11. After sampling by the pre-amplifier and signal processor 20, a plurality of background samples, such as $V_{R1}$, appear on the output line 21 of each of the channels and are applied to a respective one of the signal processing circuits 23. During the interval of of sampling of the background reference, the transistor switch 28 is turned ON connecting the capacitance C and the resistance R in series across the output lines 21 and 22. The voltage on the capacitor C is charged through the resistor R toward the value $V_{R1}$. In accordance with the present invention, the time constant of the capacitor C and the resistor R is made large in relation to the ON time of the switch. Thus, many samples are required to establish the voltage on the capacitor C equal to the voltage corresponding to the background reference $V_R$. Let it be assumed that many previous lines of scan have taken place and the voltage on the capacitor C due to sampling of the background reference is $V_{R1}$. During subsequent intervals of scan of the scene, samples $V_{S1}$ through $V_{Sn}$ are developed on the output lines 21 and 22. As the transistor switch 28 is opened during subsequent intervals of a line of scan, the sample voltage, for example, $V_{S1}$ appearing on line 21, is applied to output line 26 and has substracted from it the voltage $V_{R1}$ appearing on the capacitor C. Thus, the voltage appearing on line 26 during the signal sample $V_{S1}$ is the signal $S_1$, shown in FIG. 2B. Similarly, for the other samples $V_{S2}$ through $V_{Sn}$, the background reference sample $V_{R1}$ is subtracted therefrom to provide signal samples $S_2$ through $S_n$, also shown in FIG. 2B. The amplitude of the background sample $V_R$ varies from one signal to the next due to the shot noise associated with the detection of the radiation. The amplitude of the background component $V_{R1}$ may have a level 35 or 36, shown in dotted lines in FIG. 2A, represents noise on the background sample. The appearance of the noise component in the background signal reference reduces the signal to noise ratio resulting from the subtraction of a reference sample $V_R$ from a signal sample $V_S$ and results in a deterioration of the resultant display produced. In accordance with the present invention, the noise component on the background reference sample is eliminated by the signal processing circuit 23 of FIG. 1. In accordance with the present invention, the reciprocal of the ON time $t_{on}$ of switch 28 is set to be substantially larger than the noise bandwidth appearing on the background reference sample. Thus, during the ON time of switch 28 the amplitude of the noise component is considered substantially constant. Also, in accordance with the present invention the time constant of the capacitor C and the resistor R is made substantially larger than the ON time of the switch 28. Thus, any change in voltage resulting from a sampling of the background reference sample at the time of closing of the switch 28 appears instantaneously across the resistance R. A current flows through the resistance R causing the output side of the capacitor C to charge toward the different value of voltage. The effect is to absorb in the resistance the noise on the background reference sample. The effect of this circuit over many lines of scan is essentially to store the component representing the background reference and to suppress reference noise on the capacitor C. The extent of suppression of reference noise depends on the selection of the ON time of switch 28 and the time constant of the capacitance C and resistance R, as will be more fully explained below. This voltage is then subsequently subtracted automatically from all of the following signal samples.

Figure 3:
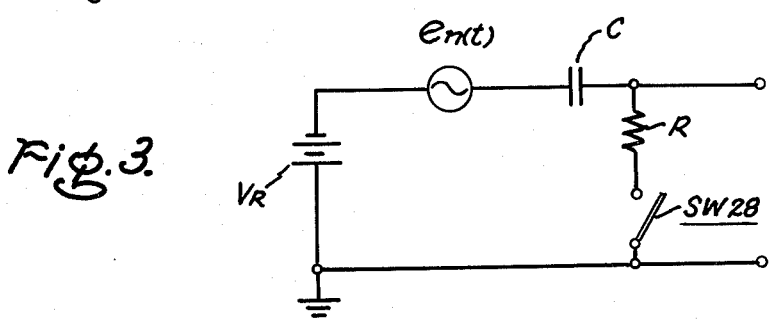
FIG. 3 shows an equivalent circuit of a portion of the apparatus of the present invention useful in further explaining the operation thereof.

The operation of the circuit 23 will be better understood from considering the equivalent circuit thereof shown in FIG. 3. Let $V_R$ represent the background component and let $e_n(t)$ the shot noise associated with it. Assume that the noise bandwidth is much less than the reciprocal of the ON time $t_{on}$ of switch 28. Thus, the shot noise $e_n(t)$ is essentially constant during the time $t_{on}$. Also assume that the capacitor has already been charged to an average value of voltage $V_R$ during many previous cycles, then the change in the output reference voltage $\Delta V_R$ stored across capacitor C may be represented by the following equation:

$$\Delta V_R = (1 - e^{\frac{-t_{on}}{T_1}}) e_n(t) \qquad (1)$$

where $T_1$ is the time constant of resistance R and capacitance C. When $T_1$ is large in relation to ON time $t_{on}$, $\Delta V_R$ can be made small. Thus $e_n(t)$ appearing on the capacitance C may be suppressed to an insignificant level. While setting the time constant $T_1$ equal to or comparable to the ON time $t_{on}$ of swtich 28 would provide significant suppression of noise on capacitor C, setting the time constant $T_1$ to be substantially greater than $t_{on}$ is preferable to attain the full extent of suppression possible.

Consider a specific example. Suppose it is desired to reduce the percentage of shot noise appearing on the coupling capacitor C by a factor of 100 to 1, that is, a 20 db rejection of shot noise. This means a 10 to 1 rejection of noise voltage on the capacitor C. From equation 1, setting $t_{on}/T_1$ equal to 1/10 would provide this result. With $t_{on}$ set equal to 100 nanoseconds, $T_1$ would be 1 microsecond. If the coupling capacitor C is equal to 10 picofarads, a resistance R of 100 kilo-ohms would provide a time constant $T_1$ of 1 microsecond. Thus, a circuit with these parameters would provide a 20 db rejection of noise due to the background reference sample.

While the invention has been described in a specific embodiment, it will be appreciated that modifications may be made by those skilled in the art, and it is intended by the appended claims to cover all such modifications and changes as fall within the true spirit and scope of the invention.

We claim:

1. Infrared detection apparatus for providing an output substantially free from background comprising a signal channel of sequential input signals, each corresponding to a line of scan of a scene and a background reference, each signal including a sample corresponding to radiation received from background reference and a plurality of succeeding samples corresponding to radiation received from said scene, circuit means for deriving a plurality of output signals, each corresponding to a respective one of said input signals in which the sample corresponding to said background reference is subtracted from each of the samples corresponding to said scene including an input terminal, an output terminal and a reference terminal, a capacitance connected between said input terminal and said output terminal, a resistance and a normally-open switch connected between said output terminal and said reference terminal, means for applying the output of said signal channel between said input terminal and said reference terminal, means for closing said normally-open switch during the time of occurrence of the sample of each input signal corresponding to said background reference, the reciprocal of the on-time of said switch being large in relation to the noise bandwidth of said sample corresponding to said background reference, the time constant of said capacitance and said resistance being greater than the on-time of said switch.

2. The apparatus of claim 1 in which the ratio of the time constant of said capacitance and resistance to the ON time of said switch is substantially greater than one.

* * * * *